(12) United States Patent
Nagel et al.

(10) Patent No.: US 8,014,941 B2
(45) Date of Patent: Sep. 6, 2011

(54) OPTIMUM ROUTE DETERMINATION EMPLOYING AN ESTIMATION FUNCTION

(75) Inventors: Philipp Harald Nagel, Bornsen (DE); Peter Vorlaender, Hamburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 229 days.

(21) Appl. No.: 11/762,539

(22) Filed: Jun. 13, 2007

(65) Prior Publication Data
US 2010/0228472 A1    Sep. 9, 2010

(30) Foreign Application Priority Data
Jun. 13, 2006    (EP) ..................................... 06012160

(51) Int. Cl.
*G01C 21/00*    (2006.01)
(52) U.S. Cl. ...................................................... 701/201
(58) Field of Classification Search .......... 701/200–202, 701/207–210, 213; 340/988, 990
See application file for complete search history.

(56) References Cited

U.S. PATENT DOCUMENTS

| 4,984,168 | A |   | 1/1991 | Neukrichner et al. ........ 364/449 |
| 6,016,485 | A | * | 1/2000 | Amakawa et al. ............ 705/400 |
| 6,567,743 | B1 | * | 5/2003 | Mueller et al. ................ 701/209 |
| 2002/0100009 | A1 |   | 7/2002 | Xing et al. ...................... 716/12 |

FOREIGN PATENT DOCUMENTS
WO    WO 03/079155    9/2003
* cited by examiner

*Primary Examiner* — Kim T Nguyen
(74) *Attorney, Agent, or Firm* — The Eclipse Group LLP

(57) ABSTRACT

A method and system for determining a route from a starting point to a destination on a road network are provided, where an estimation function for vertices of the road network is employed, and where a tiling covers an area in which at least a portion of the road network is contained. A resistance value of each tile of the tiling is provided, and the values of the estimation function for vertices of the road network are determined in accordance with the resistance values of the tiles of the tiling. In an example implementation, the resistance value of a given tile is a lower bound on or the minimum of the costs associated with an optimum route connecting any pair of vertices located on the boundary of the given tile divided by an air-line distance of the pair of vertices.

39 Claims, 18 Drawing Sheets

OPTIMUM ROUTE DETERMINATION EMPLOYING AN ESTIMATION FUNCTION

RELATED APPLICATIONS

This application claims priority of European Patent Application Serial Number 06 012 160.5, filed on Jun. 13, 2006, titled OPTIMUM ROUTE DETERMINATION EMPLOYING AN ESTIMATION FUNCTION; which is incorporated by reference in this application in its entirety.

BACKGROUND OF THE INVENTION

1. Field of the Invention

The invention relates to navigation systems and, in particular, to methods and systems for determining routes in a road network on navigation systems.

2. Related Art

Typical navigation systems provide a feature of determining a route between a given starting point to a given destination. This feature may be particularly useful in car, or other mobile, navigation systems particularly when the route information is determined to result in an optimum route. As used in this specification, the term "optimum route" includes a least-cost route, the costs of a route being determined by the sum of costs of road segments traversed when travelling on the route plus the sum of costs associated with junctions or road segment vertices. Several different cost models may be employed in navigation systems, e.g., a shortest-route model in which the costs of a road segment are given by the length of the road segment, or a fastest-route model in which the costs of a road segment are given by the length of the road segment divided by a characteristic travel speed on the road segment. Further, cost models may also take into account user preferences, such as avoiding highways, avoiding tunnels, or avoiding ferry connections.

Several algorithms for finding an optimum route are known in the art. Some known optimum route algorithms include the Dijkstra's algorithm and the A*-algorithm. In Dijkstra's algorithm, the road network, or more generally, a graph representing the road network is analyzed starting from the starting point of the route by edge relaxation. The different vertices in the road network are visited in order of minimum costs associated with a route connecting the vertex and the starting point. When the destination is expanded, an optimum route from the starting point to the destination has been found, and Dijkstra's algorithm terminates.

The A*-algorithm is a modification of Dijkstra's algorithm, which employs an estimation function for all vertices of the road network. The estimation function for a given vertex provides estimates costs associated with an optimum route connecting a given vertex and the destination. In a route search, different paths are ranked according to a priority, which may be determined by a sum of the costs accrued from the starting point to the vertex so far, and the estimation function of the vertex. If the estimation function is such that it may not overestimate costs of an optimum route connecting a vertex and the destination, the A*-algorithm may find a correct solution to the optimum path problem.

For an optimum route search on a road network, a heuristic estimation may be employed. Such a heuristic estimation may be determined based on an air-line distance between the vertex and the destination in a shortest-route search. The air-line distance may be divided by a characteristic travel speed in a fastest-route search. Typically, the better the estimation function, the smaller the number of road segment vertices that are visited in determining the optimum route and the shorter the algorithm run time.

However, estimation functions based on an air-line distance may be imprecise. Further, in navigation systems on-board a vehicle, memory and run time restrictions may be limited. Because of such limitations, it may be feasible to directly apply Dijkstra's algorithm and the A*-algorithm as may be commonly used in Europe or the US in view of the number of road segments and road segment vertices in these road networks. Dijkstra's algorithm or the A*-algorithm may often be modified for use in a navigation system, for example, by providing a classification of different road segments into different layers or by providing additional information characterizing a road network geometry, which may be determined offline and facilitate an optimum route search in the navigation system.

In this context, a least-cost routing system may use a reach metric that quantifies the relevance of a road segment for long distance travel. This reach metric may be advantageously based on map geometry only. However, there is a disadvantage of the reach metric being highly non-local in the sense that the reach of a given road segment may depend on the costs associated with a different road segment that may be far away. For example, an increase in cost factor of a road segment may result in an increase or a decrease in the reach of a different road segment, even if it is far away.

It would be desirable to use improved navigation systems and, in particular, to use methods and systems for determining routes in a road network on navigation systems.

SUMMARY

In view of the above, a method is provided for determining a route from a starting point to a destination on a road network employing an estimation function for a plurality of vertices of the road network. The estimation function provides a lower bound for costs associated with any route connecting a vertex of the road network and the destination. In accordance with an example method, a tiling covering an area is defined where at least a portion of the road network is contained. A resistance value is provided for each tile of the tiling. An estimation function value is determined for a tile boundary vertex located on a tile boundary in accordance with the resistance values of tiles of the tiling, where the resistance value of a given tile represents costs associated with routes connecting vertices of the road network located on a boundary of the given tile, so that a lower bound for costs associated with the routes connecting vertices located on the boundary of the given tile is derivable using the resistance value of the given tile.

A system for determining a route from a starting point to a destination on a road network consistent with the invention employs an estimation function for a plurality of vertices of the road network. The estimation function provides a lower bound for costs associated with routes connecting a vertex of the road network and the destination. The system includes a first storage unit containing road network data. A second storage unit contains tiling definition data defining a tiling and a resistance value for each tile. A processing unit determines an estimation function value for a tile boundary vertex located on a tile boundary in accordance with the resistance values of the tiles of the tiling, where the resistance value of a given tile, contained in the second storage unit, represents costs associated with routes connecting vertices of the road network located on a boundary of the given tile. A lower bound for costs associated with the routes connecting vertices located on the boundary of the given tile is derivable using the resistance value of the given tile.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

Examples of systems and methods consistent with the present invention are described below with reference to the following figures. Like reference numerals designate corresponding parts throughout the different views.

DETAILED DESCRIPTION

Figure 1:
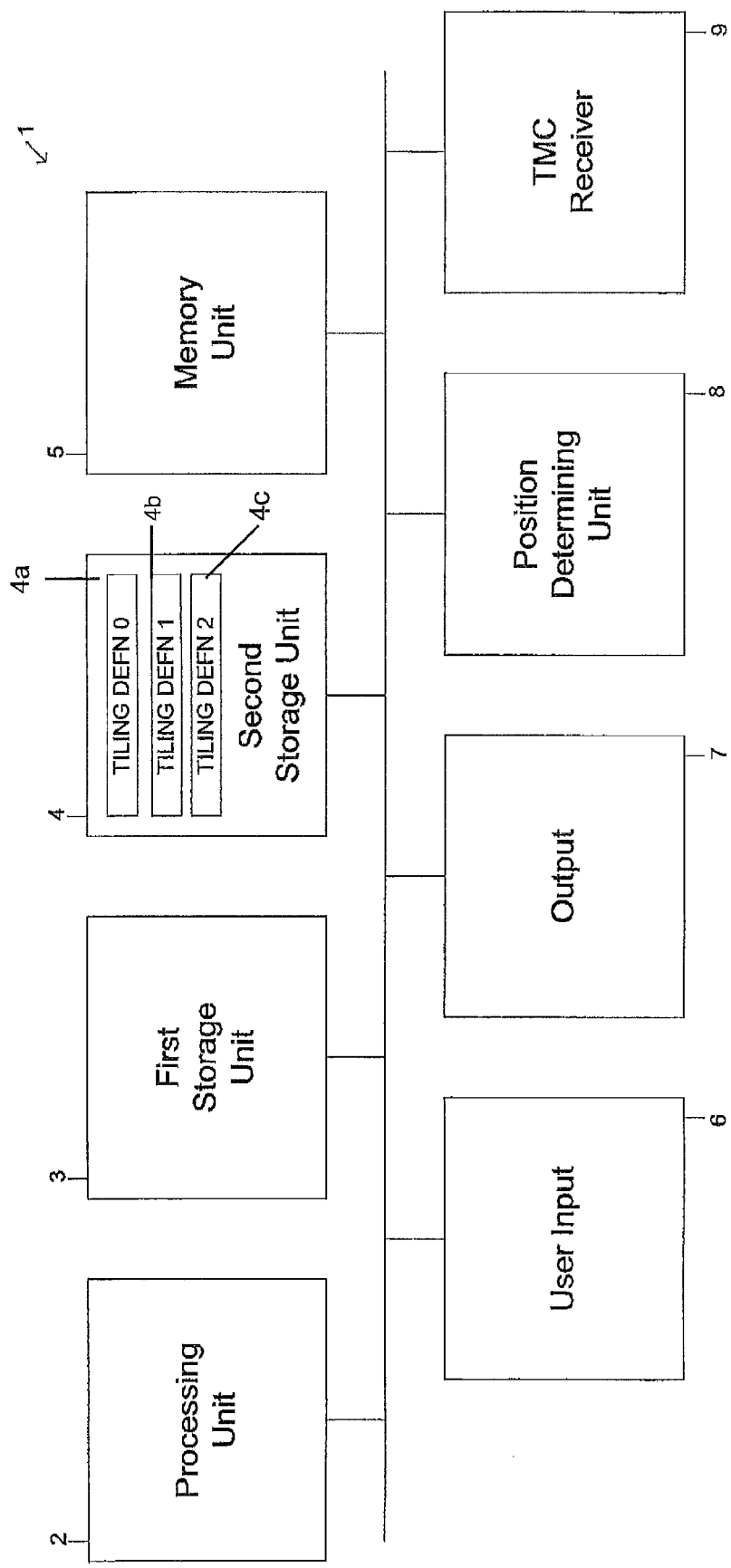
FIG. 1 is a block diagram of an example of a system for determining a route.

FIG. 1 is a block diagram of an example of a system for determining a route. The system 1 may be adapted to determine a route from a starting point to a destination on a road network using an algorithm that employs an estimation function, such as the A*-algorithm. The system 1 includes a processing unit 2, a first storage unit 3 containing road network data, a second storage unit 4 containing tiling definition data 4a-4c and resistance values for tiles of a tiling, and a memory unit 5. The first storage unit 3 and the second storage unit 4 may be different physical devices or may be a single physical device, e.g., a CD-ROM, a CD-RW, a DVD, a memory card, or an internal hard disk.

The road network data stored in the first storage unit 3 includes graphical information relating to road segment positions and orientations, such as geographical locations of the start and end points of road segments, and additional information quantifying a length of, a characteristic travel speed on, and/or a characteristic travel time for traversing the road segment. More generally, one or several attributes are associated with each road segment, specifying costs associated with traversing the road segment for a specific cost model as well as, in general, costs associated with road segment junctions.

The tiling definition data 4a-4c stored in the second storage unit 4 may be used to determine the arrangement of all tiles of the tiling. For the simple case of a rectangular tiling in which all tiles have equal size, each tile is uniquely determined by the coordinates of one of its corners or by an index or a pair of indices specifying the position of the tile in the tiling. Importantly, the second storage unit 4 also contains a resistance value of each tile of the tiling, the resistance value representing costs associated with traversing a tile, as will be explained further with reference to FIG. 2 below.

Data stored in the first storage unit 3 and in the second storage unit 4 may be stored in the memory unit 5 for further processing by the processing unit 2.

The navigation system 1 may also include a user input interface 6 for inputting, e.g., a destination or user preferences, and an output interface 7 for outputting a determined route, e.g., on a display or via a voice output unit. The navigation system 1 may also include a position determining unit 8, which may operate using a GPS receiver, and a traffic message channel ("TMC") receiver 9.

Figure 2:
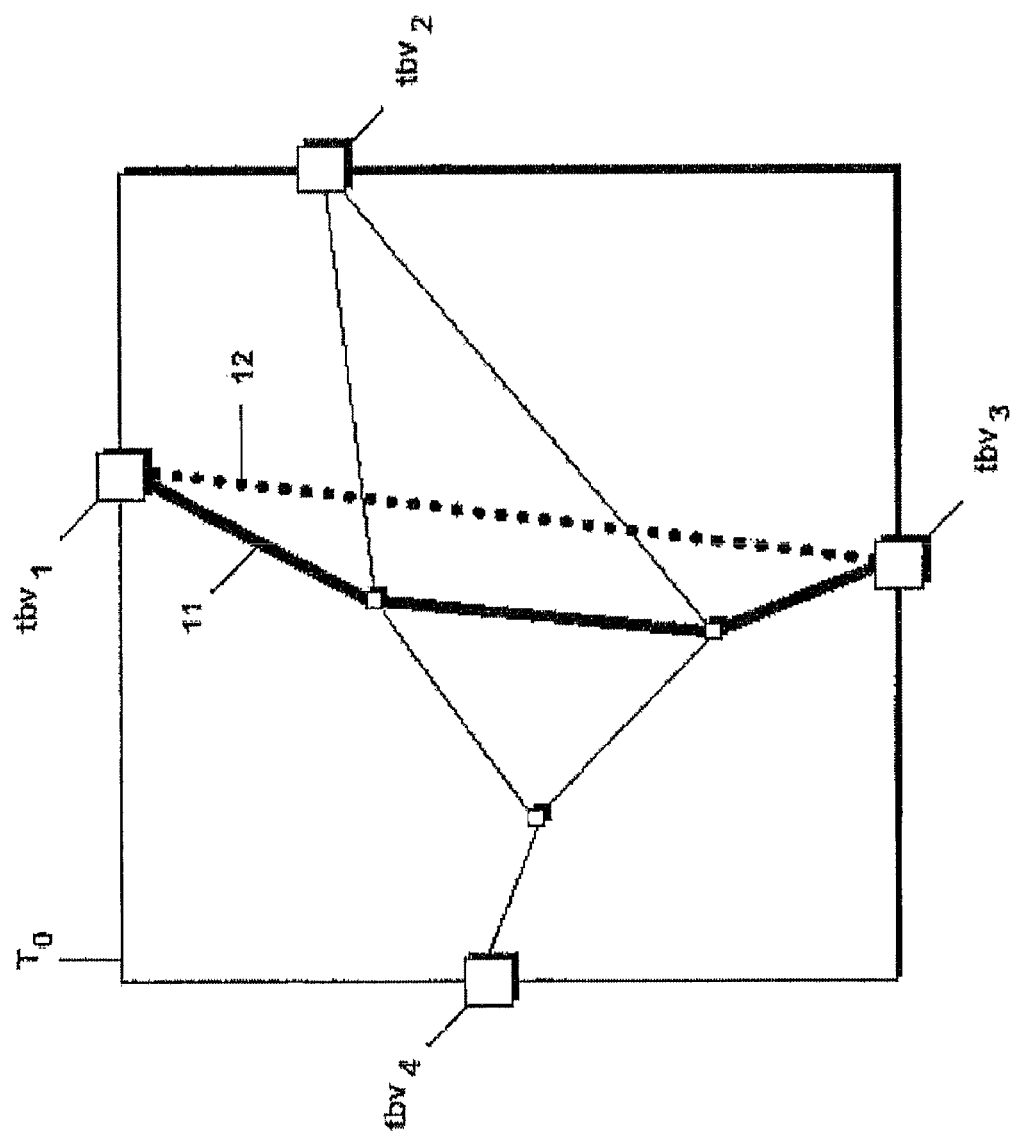
FIG. 2 depicts a portion of a road network illustrating determination of a resistance value.
Figure 3:
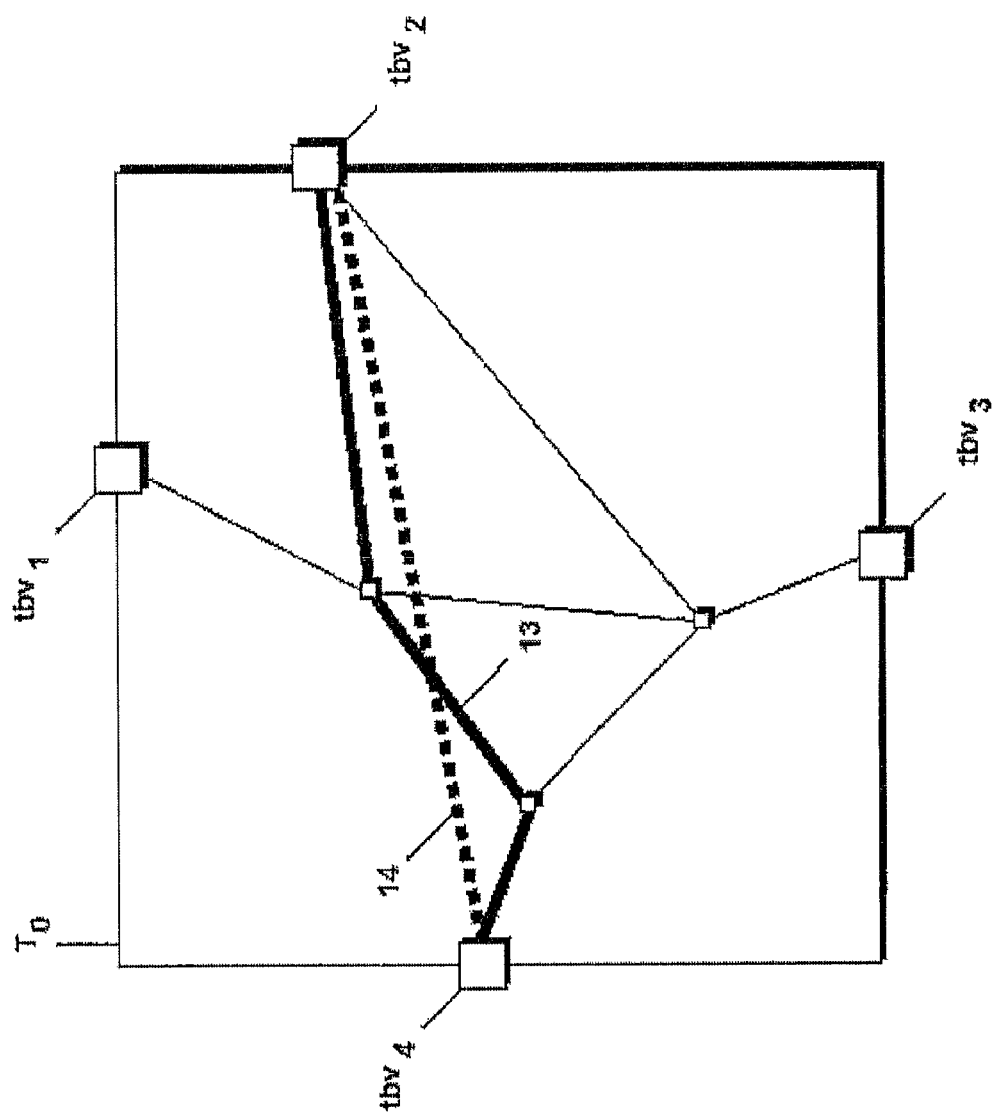
FIG. 3 depicts a portion of a road network illustrating determination of a resistance value.

FIGS. 2 and 3 depict a portion of a road network illustrating determination of a resistance value. FIG. 2 shows a tile $T_0$ in which a portion of a road network is located. Road segments terminate at vertices indicated by squares, where small squares indicate vertices located inside of a tile, while large squares indicate vertices $tbv_1$-$tbv_4$ located on a boundary of the tile.

In order to determine the resistance value of the tile $T_0$, all of the vertices located on the tile boundary, in the present case vertices $tbv_1$-$tbv_4$, are identified. For each pair of these vertices located on the tile boundary, an optimum route connecting the pair of vertices is determined. The optimum route may be determined using any suitable method. In the example shown in FIGS. 2 and 3, the optimum route is determined using Dijkstra's algorithm to illustrate one example. For the pairs consisting of vertices $tbv_1$ and $tbv_2$ and of vertices $tbv_2$ and $tbv_4$, these optimum routes are schematically indicated as thick lines 11 and 13, respectively, in FIGS. 2 and 3. FIG. 2 shows tile $T_0$ with optimum route 11 between vertices $tbv_1$ and $tbv_2$, and FIG. 3 shows tile $T_0$ with optimum route 13 between vertices $tbv_2$ and $tbv_4$. For each such pair of vertices, an air-line distance is computed. The air-line distance is schematically indicated as dotted lines 12 and 14 in FIGS. 2 and 3, respectively, for vertices $tbv_1$ and $tbv_3$, and $tbv_2$ and $tbv_4$. The quotient of the costs associated with the optimum route connecting two vertices and the air-line distance of the two vertices may then be computed. The minimum of all these quotients for the various pairs of vertices located on the boundary of the tile is determined and the resistance value of the tile $T_0$ is set to this minimum.

The resistance values of a given tile may be expressed by the following equation:

$$R = \min_{tbv_i} \min_{tbv_j \neq tbv_i} \frac{\text{costs}(tbv_i; tbv_j)}{\text{air-line distance}(tbv_i; tbv_j)}, \quad (eq. 1)$$

where R denotes a resistance value of a tile, tbvi and tbvj denote vertices located on the boundary of the tile, cost (tbvi; tbvj) denotes the costs associated with a least-cost path connecting tbvi and tbvj and traversing the tile, and air-line distance (tbvi; tbvj) denotes the air-line distance of the pair of vertices tbvi and tbvj.

The costs typically include contributions of both road segment costs and costs associated with road segment junctions, which are both taken into consideration.

Given the above definition of the resistance value, for arbitrary vertices tbvi and tbvj located on the boundary of the tile, the costs associated with an optimum route connecting these vertices fulfils the following inequality:

$$\text{costs}(tbv_i; tbv_j) \geq R \times \text{air-line distance}(tbv_i; tbv_j) \quad (eq. 2)$$

Typically, the right hand side of (eq. 2) may be easily determined if the resistance value R of the tile is known thereby providing a lower bound for the costs associated with an optimum route connecting the pair of vertices.

In general, an optimum route search in a road network may correspond to a route search in a directed graph, i.e., costs associated with a route from $tbv_1$ to $tbv_3$ may be different from costs associated with a route from $tbv_3$ to $tbv_1$, for example, if one-way roads are located within the tile or if speed limits of road segment are different for opposite travel directions. Therefore, in general, the expression on the right-hand side of (eq. 1) may be evaluated for a directed graph, using the given order of vertices in the numerator of the quotient.

The costs associated with optimum routes connecting vertices located on the tile boundary may also depend on the cost model employed. Therefore, for each tile of the tiling, several resistance values may be determined for the most important cost models, such as shortest route and fastest route, and the different resistance values may be stored in the second storage unit 4. In this respect, the resistance values are generally not computed onboard a vehicle, but rather during a phase of road network data pre-processing for subsequent use in route determination.

Figure 4:
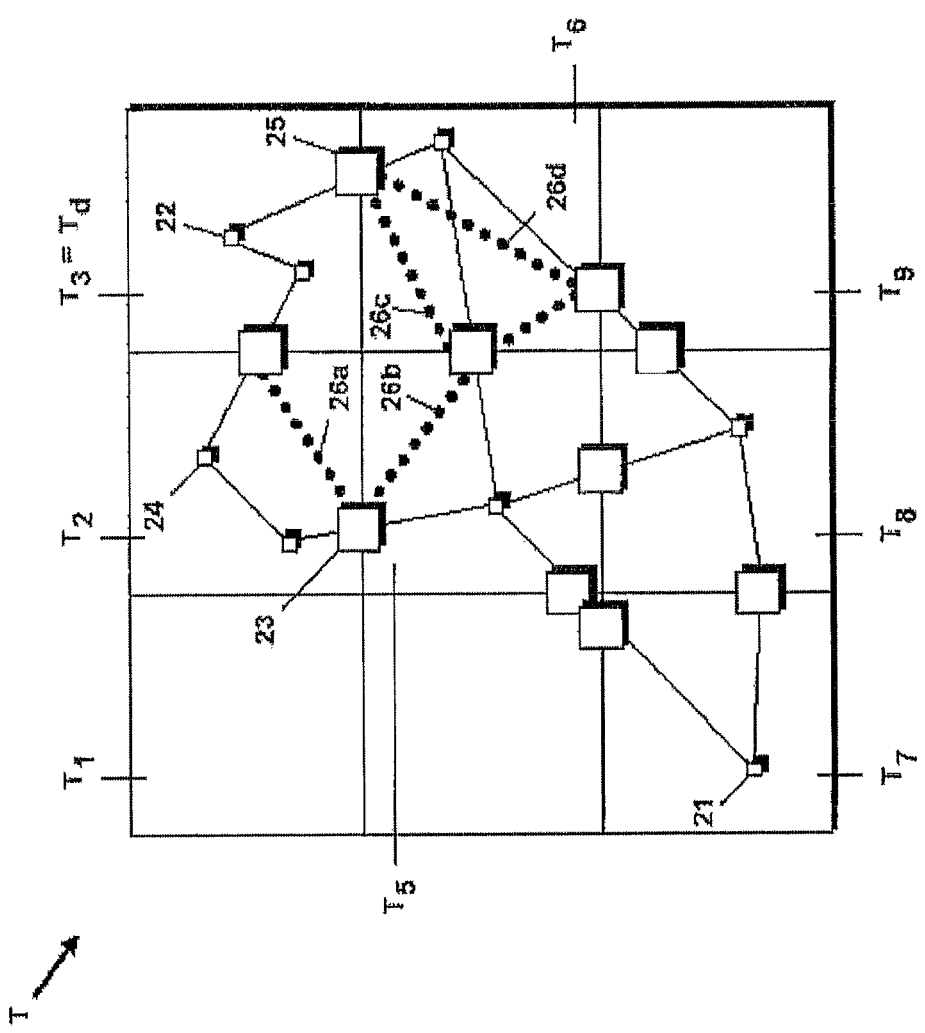
FIG. 4 depicts a road network and corresponding tiling illustrating an example method for determining an estimation function for a vertex located on a tile boundary.

FIG. 4 depicts a road network and corresponding tiling illustrating an example method for determining an estimation function for a vertex located on a tile boundary. Resistance values used in route determination may be computed as indicated above. In one example, an estimation function, as it is employed, for example, in a process that employs an A*-algorithm, may be readily derived from the resistance values.

Referring to FIG. 4, the tiling includes tiles $T_1$-$T_9$. Vertices of the road network are, again, indicated by squares, large squares indicating vertices located on tile boundaries. To illustrate by example, it is assumed that an optimum route is to be determined from a starting point 21 to a destination 22. It will also be assumed that resistance values determined as indicated above are known for all tiles $T_1$-$T_9$ of the tiling. An optimum route determined using an A*-algorithm includes determining an estimation function for each vertex of the road network. The estimation function provides a lower bound for costs associated with an optimum route connecting an arbitrary vertex of the road network and the destination.

For a vertex located on a tile boundary, for example, for vertex 23 in FIG. 3, a value of the estimation function for this vertex may be determined as follows. First, a destination tile $T_3$ containing the destination 22 and the vertices 24, 25 located on the boundary of the destination tile are identified. Next, a process using Dijkstra's algorithm is performed starting from each one of the vertices 24, 25 located on the boundary of the destination tile $T_3$, to generate a sub-graph consisting of the vertices of the road network located on tile boundaries only. Some of the edges of this sub-graph are indicated by dotted lines 26a-26d in FIG. 4. The costs associated with any such edge of the sub-graph may be determined using (eq. 2). The costs associated with a sub-graph edge are set to the resistance value of the tile traversed by the sub-graph edge multiplied by an air-line distance of the vertices connected by the edge. For example, the costs associated with edge 26a are set to the resistance value of tile $T_2$ multiplied by the air-line distance of vertices 23 and 24. Since the sub-graph consisting of vertices located on tile boundaries only is typically much smaller than the original road network, Dijkstra's algorithm may be readily performed starting from any one of the vertices 24, 25 located on the boundary of the destination tile. In an example implementation, Dijkstra's algorithm is performed simultaneously for all destination tile boundary vertices by inputting all of these vertices into Dijkstra's algorithm as a set of origins. Further, using (eq. 2), the costs associated with an optimum route on the sub-graph provide a lower bound on the costs associated with an optimum route on the original road network. Assuming, for example, that an optimum route on the sub-graph connects vertex 24 with vertex 23 via edge 26a, then the resistance value of tile $T_2$ multiplied by the length of edge 26a provides a lower bound on the costs associated with an optimum route from vertex 24 to vertex 23 on the original road network.

Accordingly, once the costs associated with optimum routes connecting a vertex 23 located on a tile boundary with any one of the vertices 24, 25 located on the boundary of the destination tile is known on the sub-graph, the minimum of all these costs also provides a lower bound for costs associated with an optimum route on the original graph.

More generally, the estimation function for a vertex located on a tile boundary ("tbv" may be established from the following equation:

$$\text{estimation function}(tbv) = \min_{dtbv_i} \text{costs}_{SG}(dtbv_i; tbv), \quad (eq. 3)$$

where $dtbv_i$ denote vertices located on the boundary of the destination tile, and $\text{costs}_{SG}$ denote costs associated with optimum routes on the sub-graph as described above, the route connecting $dtbv_i$ and tbv. The minimum on the right-hand side of the above equation is taken over all vertices located on the boundary of the destination tile.

The accuracy of the estimation function may be further improved by taking into account the costs associated with routes connecting the destination 22 with the destination tile boundary vertices 24, 25:

$$\text{estimation function}(tbv) = \min_{dtbv_i}[\text{costs}_{SG}(dtbv_i; tbv) + \text{costs}(d; dtbv_i)], \quad (eq. 4)$$

where the second term in the square brackets on the right-hand side of (eq. 4) represents the costs of an optimum route connecting the destination with each one of the destination tile boundary vertices. These costs may for example be determined using Dijkstra's algorithm in the destination tile $T_3$. However, any lower bound may be used instead of the actual costs. For example, a lower bound may be based on air distance only. For the case of a trivial lower bound, for which the second term in the square brackets of (eq. 4) is set to zero, (eq. 4) reduces to (eq. 3).

In an example implementation in which Dijkstra's algorithm is performed such that all destination tile boundary vertices are simultaneously input as a set of origins, the right-hand side of (eq. 4) can be readily determined in this Dijkstra's algorithm if costs (d; dtbv$_i$) are already known. For example, by performing Dijkstra's algorithm on the destination tile on the original road network, and if these values are input to the Dijkstra's algorithm performed on the sub-graph defined as described above.

Alternatively, the right-hand side of (eq. 4) can be computed by defining a new graph comprising the original road segments located in the destination tile and, outside the destination tile, edges connecting vertices located on tile edges only. Such a re-defined graph, shown in FIG. 12, will be explained in more detail below. The costs determined for tile boundary vertices by performing Dijkstra's algorithm on the re-defined graph are the right-hand side of (eq. 4) for the respective tile boundary vertices.

It will be appreciated that, while the above explanation has been restricted to vertex 23 for illustrative purposes, the estimation function for any vertex located on a tile boundary may be determined as described above. Once the estimation function has been determined for all vertices located on tile boundaries, it may also be readily determined for vertices located in the inside of a tile, as described below with reference to FIGS. 5 and 6.

Figure 6:
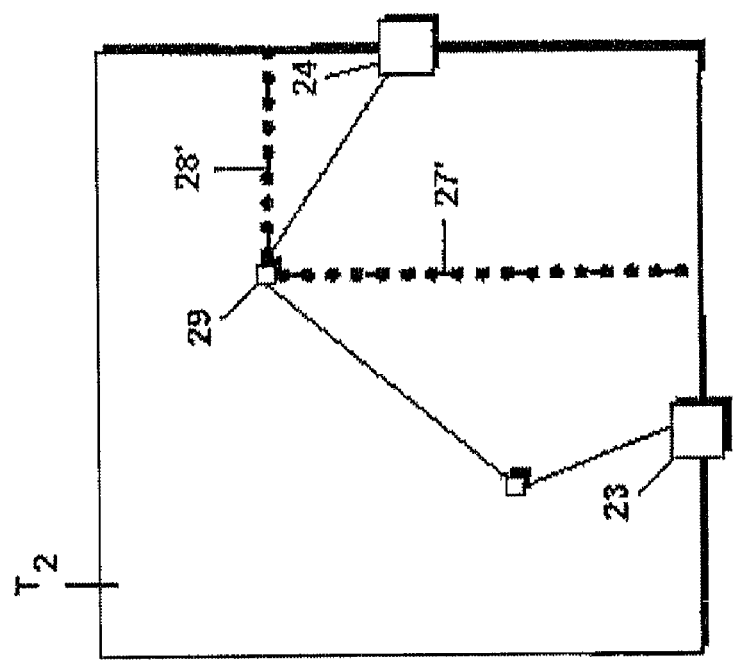
FIG. 6 depicts a portion of the road network of FIG. 4 illustrating another method for determining an estimation function for an interior vertex of a tile.
Figure 5:
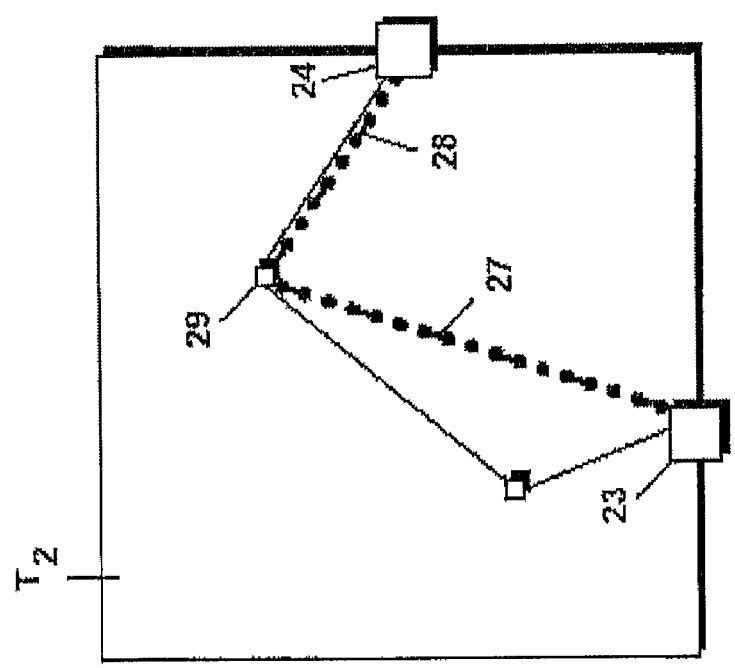
FIG. 5 depicts a portion of the road network of FIG. 4 illustrating a method for determining an estimation function for an interior vertex of a tile.

FIGS. 5 and 6 depict a portion of the road network of FIG. 4 illustrating a method for determining an estimation function for an interior vertex of a tile. FIGS. 5 and 6 show a tile T$_2$ of the tiling T of FIG. 4 and the portion of the road network located in tile T$_2$. Since the estimation function has already been determined for vertices 23 and 24, a lower bound is provided for costs associated with an optimum route connecting these vertices and the destination, the estimation function for vertex 29 located inside tile T$_2$ may be determined as follows.

In an example implementation, the exact costs associated with optimum routes connecting vertex 29 with vertices 23 and 24, respectively, may be determined using Dijkstra's algorithm. Next, the sum of these costs and the estimation function of the corresponding vertex located on the tile boundary are computed, and the smaller one of the sums provides the estimation function value for vertex 29. However, it is not necessary to compute the exact costs associated with an optimum route connecting vertex 29 and vertex 24 or vertex 23. Rather, any suitable lower bound may be employed. For example, as shown in FIG. 5, the air-line distances schematically indicated as dashed-dotted lines at 27 and 28, respectively, may be used for estimating the costs associated with routes connecting vertex 29 and the vertices located on the boundary of tile T$_2$.

Since the computation of air-line distances as shown in FIG. 5 involves the evaluation of square routes, in order to further expedite the computation of the estimation function, the perpendicular distances 27' and 28' may also be employed as lower bounds for costs associated with routes inside the tile, as schematically indicated in FIG. 6. For example, assuming a shortest-route search, the estimation function of vertex 29 is set to the smaller of the estimation function of vertex 24 plus the perpendicular distance 27' and the estimation function of vertex 24 plus the perpendicular distance 28'. In another example, the estimation function for each vertex inside the tile may be set to the minimum of the estimation functions of the vertices located on the boundary of this tile, reducing computational complexity in determining the estimation function at the expense of accuracy of the estimation function.

FIGS. 2-6 illustrate various aspects underlying the determination of an estimation function according to different example implementations. FIGS. 6-10 are described below to illustrate operation of methods for determining a route from a starting point to a destination.

Figure 7:
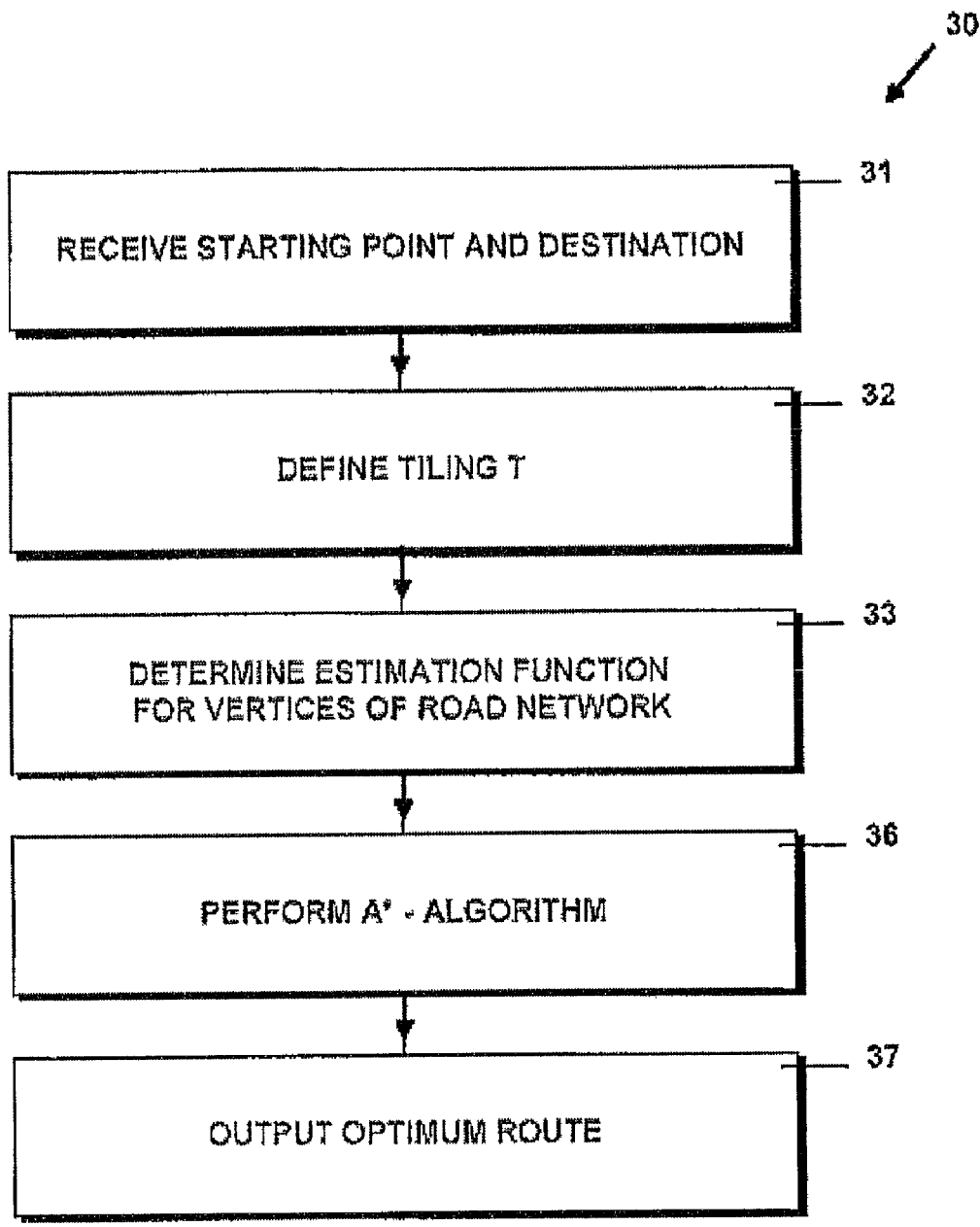
FIG. 7 is a flowchart of an example of a method for determining a route.

FIG. 7 is a flowchart of an example of a method for determining a route, the method generally being indicated by reference number 30. At step 31, a starting point and a destination are received. Information relating to the starting point and the destination may, for example, be received via a user input, or the starting point may also be provided automatically by the position determining unit 8.

At step 32, the tiling T that covers an area containing at least a portion of the road network on which the optimum route search is to be performed is identified. At step 33, the estimation function for a plurality of vertices of the road network is determined, as described in more detail below with reference to FIGS. 8-11 below. Once the estimation function is known for all or, at least, all relevant vertices of the road network, a process using an A*-algorithm is performed at step 36 for determining an optimum route from the starting point to the destination based on the estimation function previously determined in step 33. At step 37, the optimum route is output via the output means 7. For example, the output map may be displayed in the form of an electronic map on a display device, or announced audibly as a voice output over a speaker device.

Figure 8:
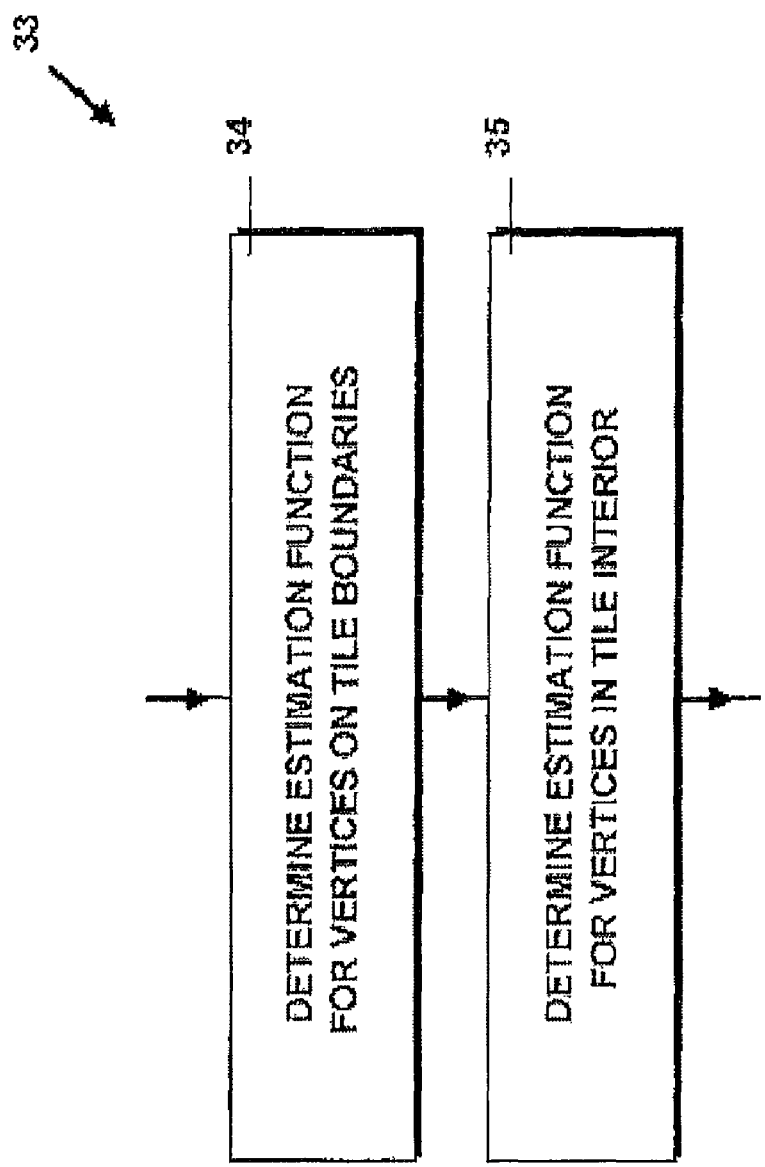
FIG. 8 is a flowchart of an example of a sub-routine that may be used in the method of FIG. 7.

In an example implementation, step 33 of determining the estimation function for vertices of the road network may be performed as a two-step process. FIG. 8 is a flowchart of an example of a sub-routine that may be used in the method of FIG. 7 as step 33. As shown in the flowchart of FIG. 8, at step 34, the estimation function is determined for vertices located on tile boundaries, and, at step 35, the estimation function is determined for vertices located in tile interiors.

Figure 9:
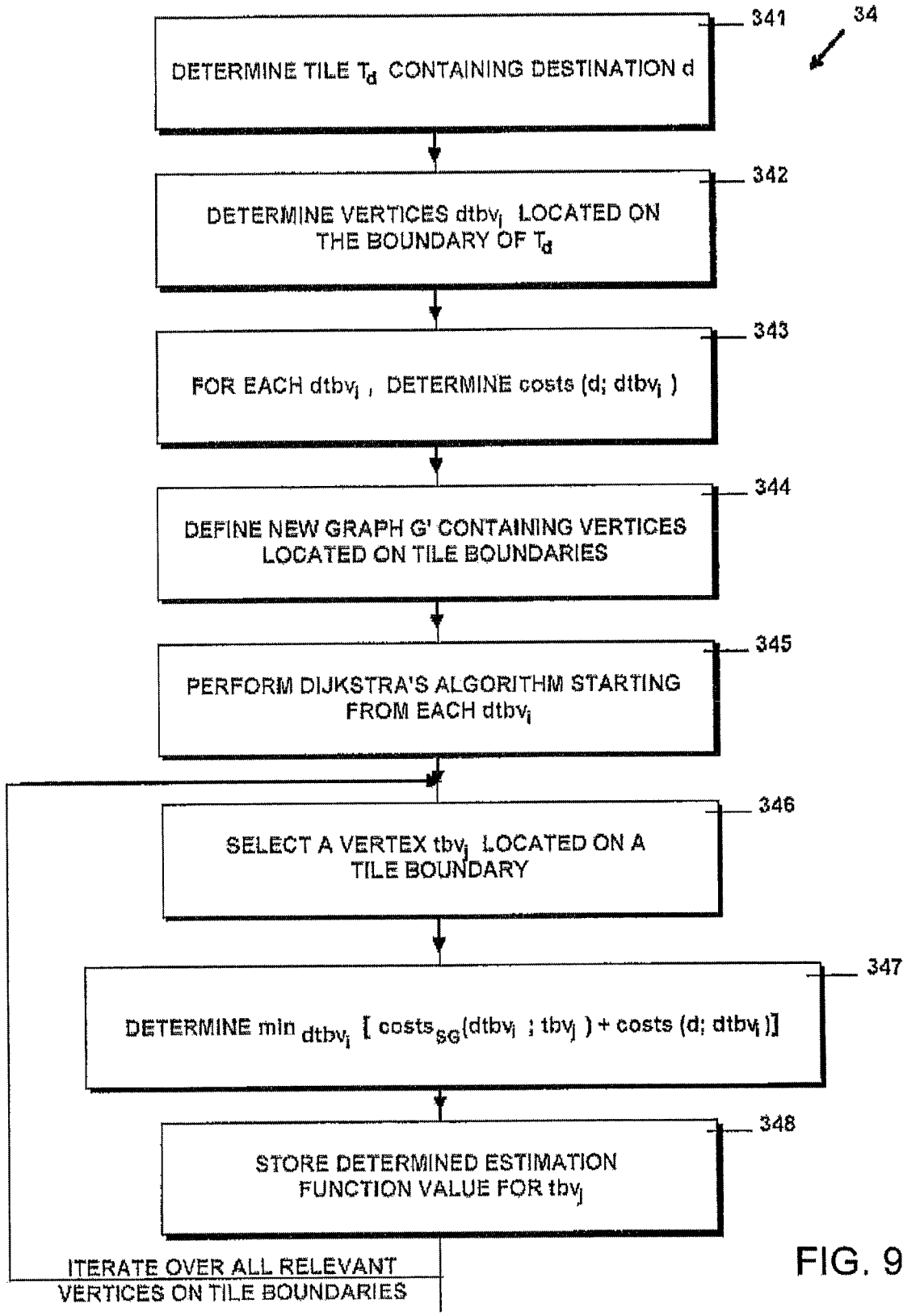
FIG. 9 is a flowchart of another example of a sub-routine that may be used in the method of FIG. 7.

FIG. 9 is a flowchart of another example of a sub-routine that may be used in the method of FIG. 7. FIG. 9 illustrates an example for performing step 34 (in FIG. 8) of determining the estimation function for vertices located on tile boundaries. First, at step 341, the tile T$_d$ containing the destination d is determined, and at step 342, the vertices located on the boundary of the tile T$_d$ are determined. The tile boundary vertices are denoted by dtbv$_i$. At step 343, for each vertex located on the boundary of the destination tile, a lower bound for the costs associated with an optimum route connecting the destination d and the destination tile boundary vertex is determined. The lower bound is denoted as cost (d; dtbv$_i$). The lower bound may be determined, for example, using Dijkstra's algorithm on the destination tile, or employing any other suitable method including methods described above with reference to FIG. 4.

At step 344, a new graph is defined, which is a sub-graph of the original road network and includes vertices located on tile boundaries only. As described above with reference to FIG. 4, the costs associated with an edge of the sub-graph may be determined based on the resistance values of the various tiles of the tiling, generally in combination with geometrical properties of the road network. At step 345, a process using Dijkstra's algorithm may be performed starting from each one of the vertices located on the destination tile. In an example implementation, Dijkstra's algorithm in step 345 is performed only once, having all destination tile boundary vertices as a set of origins. In another example, in step 345, a process using an A*-algorithm may be performed, directed from the destination tile boundary vertices towards the starting point and employing an air-line-based estimation. In steps 346-348, an iteration may be performed over vertices located on tile boundaries in order to determine the estimation function for these vertices. At step 346, a vertex located on a tile boundary is selected. At step 347, the estimation function for this vertex may be determined as described above with reference to (eq. 4). At step 348, the determined estimation function value is stored in the memory unit 5.

The iteration over vertices located on tile boundaries in steps 346-348 may be terminated according to any suitable termination criteria. For example, the iteration in steps 346-348 may be terminated if the estimation function is known for all vertices located on tile boundaries or, at least, for all vertices located on the boundaries of tiles which may be relevant to the optimum route determination.

It is noted that the flowchart of FIG. 9 is only an example. In another example, several of the steps depicted in FIG. 9 may be performed in parallel. For example, step 345 and the iteration in steps 346-348 may be performed such that a process using Dijkstra's algorithm or a process using an A*-algorithm is performed, having all destination tile boundary vertices simultaneously as input, the search being performed towards the starting point of the route search. In another example, steps 343, 345, and 346-348 may be performed in parallel by first re-defining the graph, as will be explained with reference to FIG. 12 below, and by performing a process using Dijkstra's algorithm or an A*-algorithm on the re-defined graph. Once the estimation function is known for all relevant vertices located on tile boundaries, at step 35 of FIG. 8, the estimation function is determined for vertices located in the inside of tiles, as described below with reference to FIG. 10.

Figure 10:
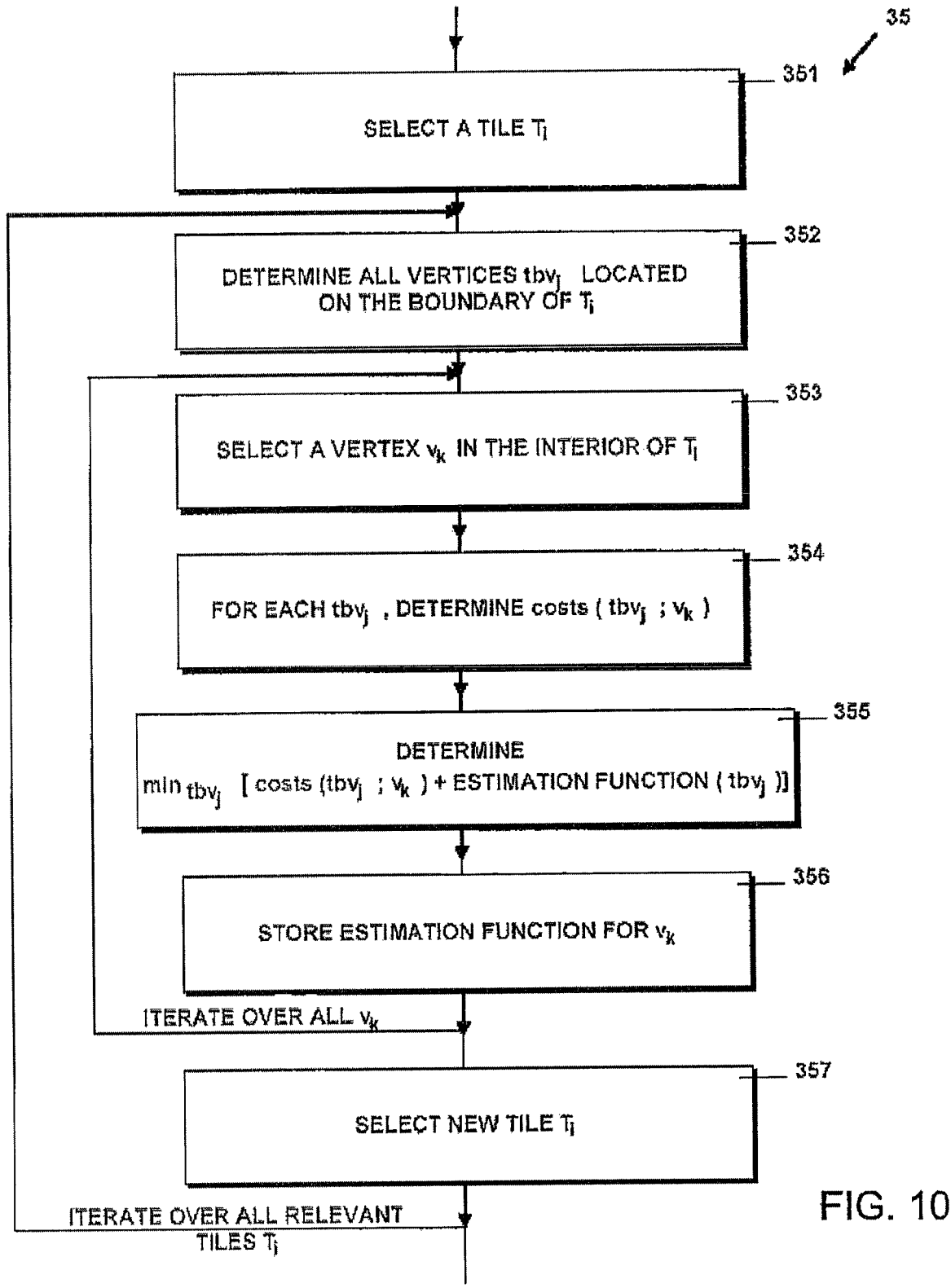
FIG. 10 is a flowchart of another example of a sub-routine that may be used in the method of FIG. 7.

FIG. 10 is a flowchart of another example of a sub-routine 35 that may be used in the method of FIG. 8. First, at step 351, a tile $T_i$ is selected. Then, at step 352, all vertices located on the boundary of this tile are determined. An iteration over all vertices ($v_k$) located in the interior of the tile is performed in steps 353-356. First, at step 353, a vertex located in the tile interior is selected. At step 354, for each vertex located on the boundary of this tile, a lower bound on the costs of an optimum route connecting the selected vertex in the interior of the tile and the vertex located on the tile boundary is determined. While, in FIG. 10, lower bound on the costs is shown as being the exact costs associated with an optimum route connecting these two vertices, using a process that uses Dijkstra's algorithm on the selected tile, any other suitable method for obtaining a lower bound for these costs may be employed, as described above with reference to FIGS. 5 and 6. At step 355, the minimum of these costs plus the estimation function for the corresponding vertex located on the tile boundary is determined, and the estimation function for the vertex located in the tile interior is set to this minimum. At step 356, the determined estimation function value is stored. An iteration is performed with steps 353-356 over all vertices located in the tile interior. After the iteration terminates, at step 357, a new tile $T_1$ is selected, and an iteration with steps 352-356 is performed over all relevant tiles of the tiling.

Referring back to FIG. 7, with the estimation function for all relevant vertices of the road network being determined based on the resistance values of the tiles of the tiling, a process using an A*-algorithm employing this estimation function may be performed. It is noted that the definition of the tiling T and the provision of resistance values for tiles of the tiling allows the estimation function employed in the A*-algorithm to be computed.

It will be appreciated that the above description with reference to FIGS. 7-10 illustrates an example, and that various modifications may be implemented. For example, in step 344 in FIG. 9, if the vertices are located on opposite edges of the tile boundary, the costs associated with an edge connecting the pair of vertices may be approximated by the product of the resistance value and the edge length of the tile. In another example for computing the estimation function, a plurality of vertices located on one edge of a tile may be contracted into a single vertex, further reducing complexity of the computation of the estimation function.

While, in the above description, in steps 343, 347, 354, and 355, the exact costs associated with an optimum route connecting a vertex located in the interior of a tile and a vertex located on the tile boundary have been employed, any other suitable method providing a lower bound for these costs may be used. For example, as explained with reference to FIGS. 4 and 5 above, an air-line distance of vertices, or a distance of the vertex from tile boundaries may be employed for deriving a lower bound on these costs.

Figure 11:
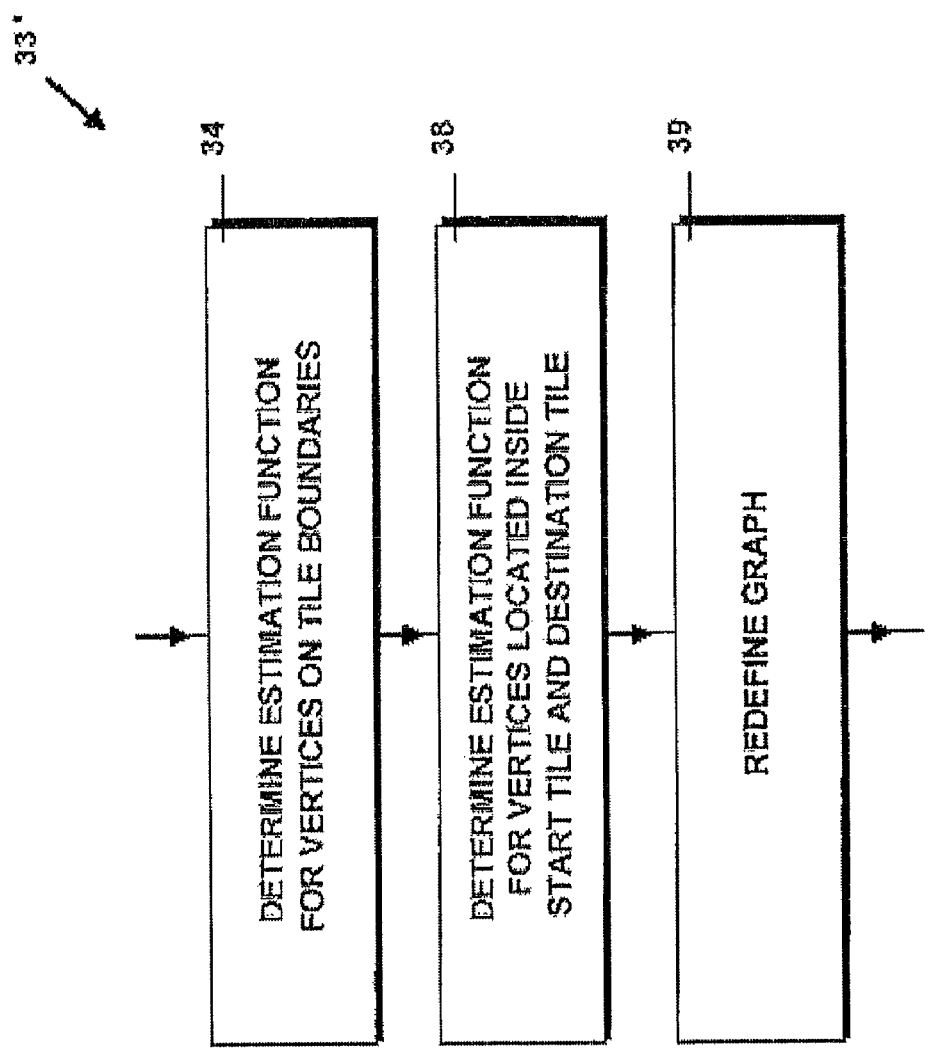
FIG. 11 is a flowchart of another example of a sub-routine that may be used in the method of FIG. 7.

Another example of the method shown in FIG. 7 is described below with reference to FIGS. 11 and 12. FIG. 11 is a flowchart of another example of a sub-routine 33' that may be used in the method of FIG. 7. The sub-routine 33' provides an example method for performing the step of determining an optimum route from the starting point to the destination. In step 33', the estimation function for vertices located in tile interiors is not computed.

Referring to FIG. 11, at step 34, the estimation function is determined for vertices located on tile boundaries. This step may be performed as described above with reference to FIG. 9. At step 38, the estimation function is determined for vertices located inside the start tile containing the starting point and inside the destination tile containing the destination. For the destination tile, the estimation function may be determined, for example, using a process that uses Dijkstra's algorithm starting from the destination. For the start tile, the estimation function may be determined as described above with reference to FIG. 10. At step 39, the graph on which an optimum route search is to be performed may be modified. For example, the graph may be modified to include all vertices located in the start tile and the destination tile, as well as all vertices located on tile boundaries.

Figure 12:
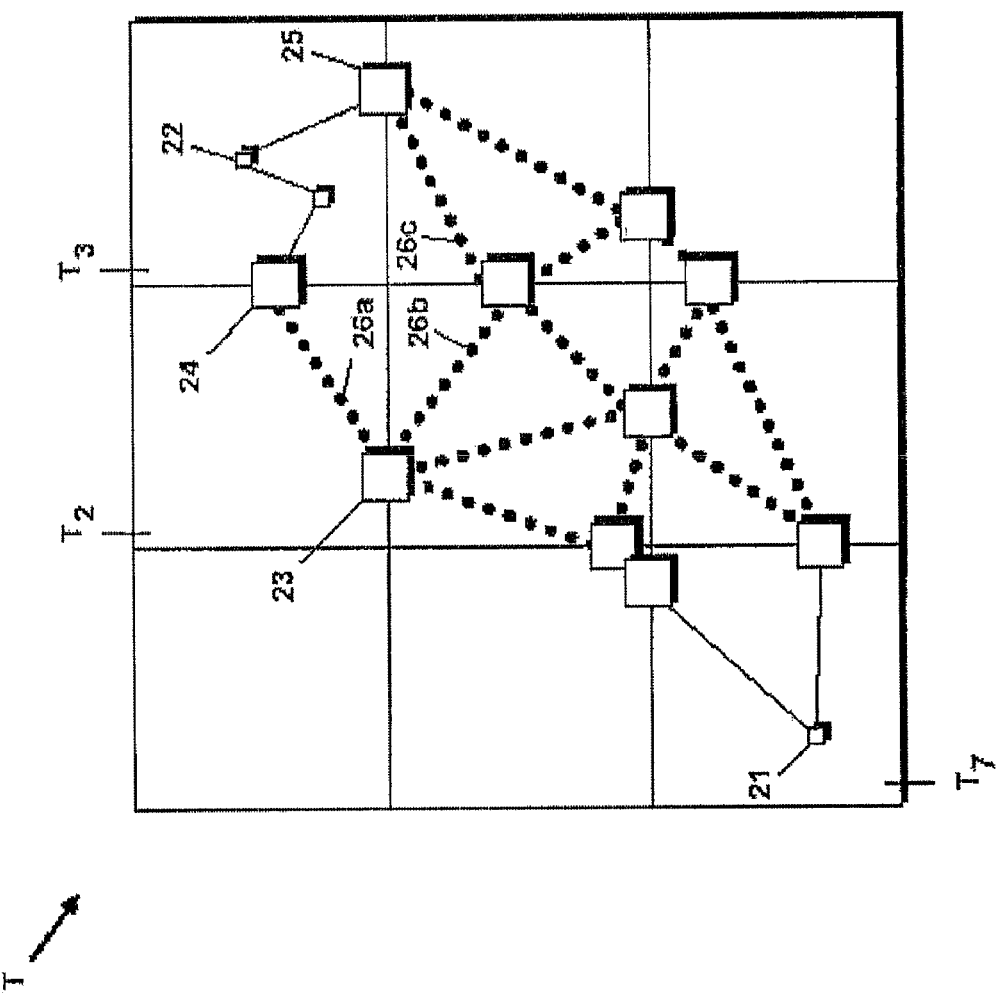
FIG. 12 illustrates operation of the method of FIG. 11 using the road network and tiling of FIG. 4.

FIG. 12 illustrates operation of the method of FIG. 11 using the road network and tiling of FIG. 4. The costs associated with those edges of the modified graph connecting pairs of vertices located on the boundary of one tile may be determined in any suitable way, such as for example, by performing a process that uses Dijkstra's algorithm on this tile. The minimum costs associated with a route connecting the pair of vertices located on the tile boundary may then be determined. An optimum route search may be performed on the modified graph. Since vertices of a tile are contracted into a smaller number of vertices located on the boundary of the tile, the vertices may be extracted prior to outputting a determined optimum route to a user. This may, for example, again be achieved by an optimum route search based on the use of Dijkstra's algorithm for individual tiles.

It is noted that in FIGS. 4 and 12, the tiling T is shown to include a plurality of tiles having identical size and shape. The tiles in a tiling may, however, be of any size and shape.

Figure 13:
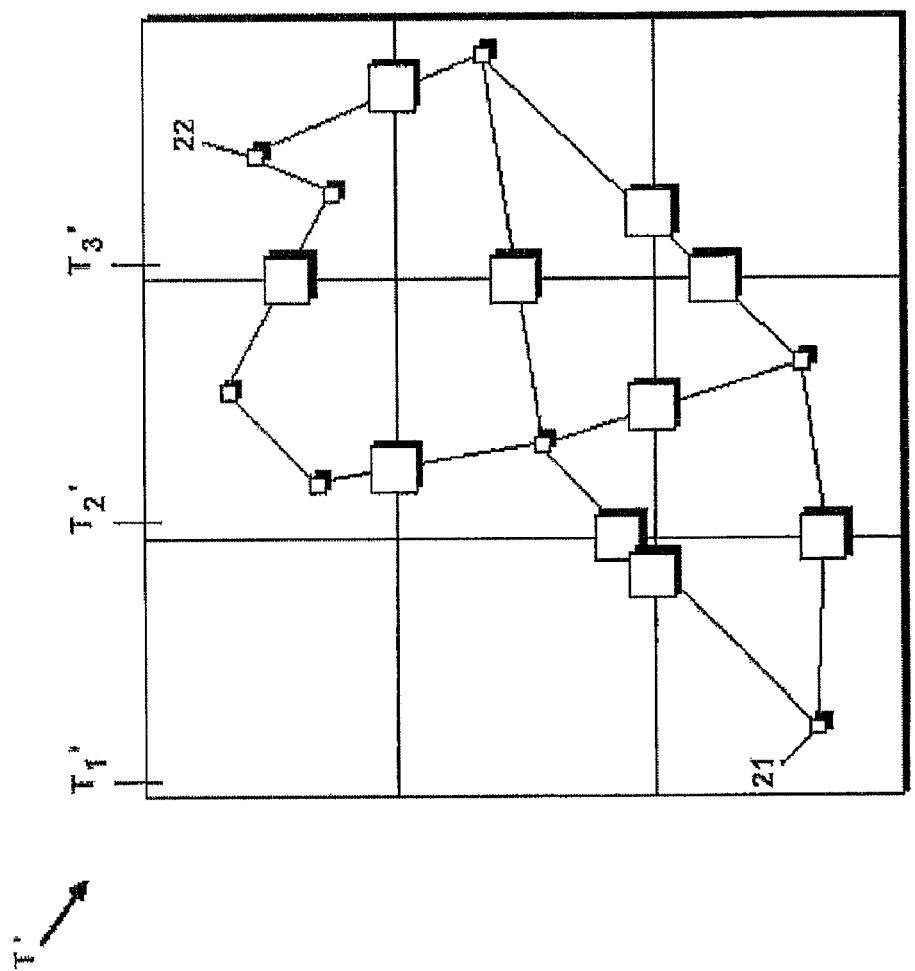
FIG. 13 illustrates another example method using the road network of FIG. 3 and different filings.
Figure 14:
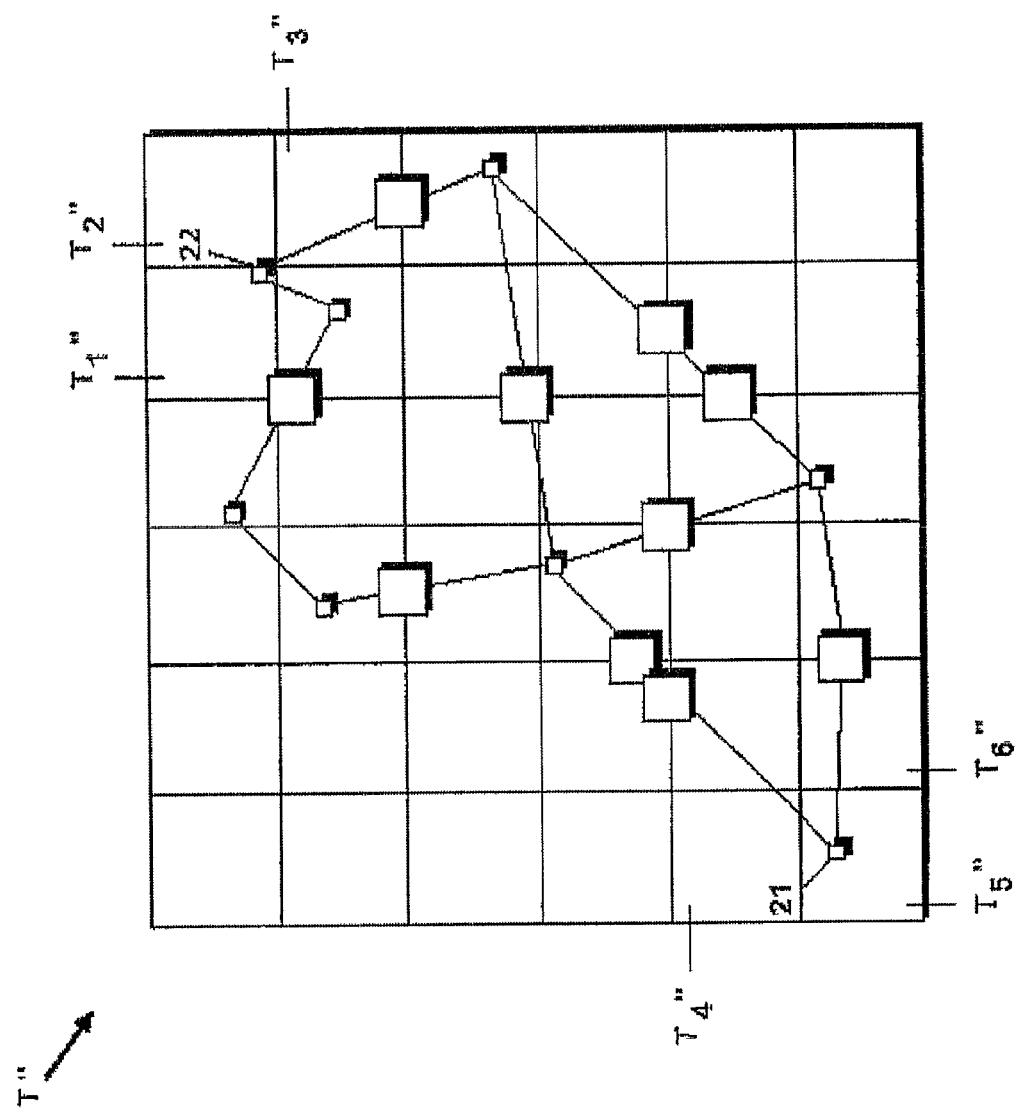
FIG. 14 illustrates yet another example method using the road network of FIG. 3 and different filings.

As described below with reference to FIG. 13, tilings having an inhomogeneous tiling size may be selected. To illustrate, two different tilings T' and T" shown in FIGS. 13 and 14, respectively. Tiling T' shown in FIG. 13 and T" shown in FIG. 14 may be defined to cover the area in which at least a portion of the road network is contained. It is noted that, for the tiling T", the road network may be defined to have a vertex on the intersection of each road segment and tile boundary, but that not all of these vertices are displayed for clarity of representation.

For both the tiling T' and the tiling T", a resistance value may be computed for each tile, as explained with reference to FIG. 2 above. The tiling definition data and associated resistance values are stored in the second storage unit 4 in FIG. 1 for both filings T', T".

Figure 15:
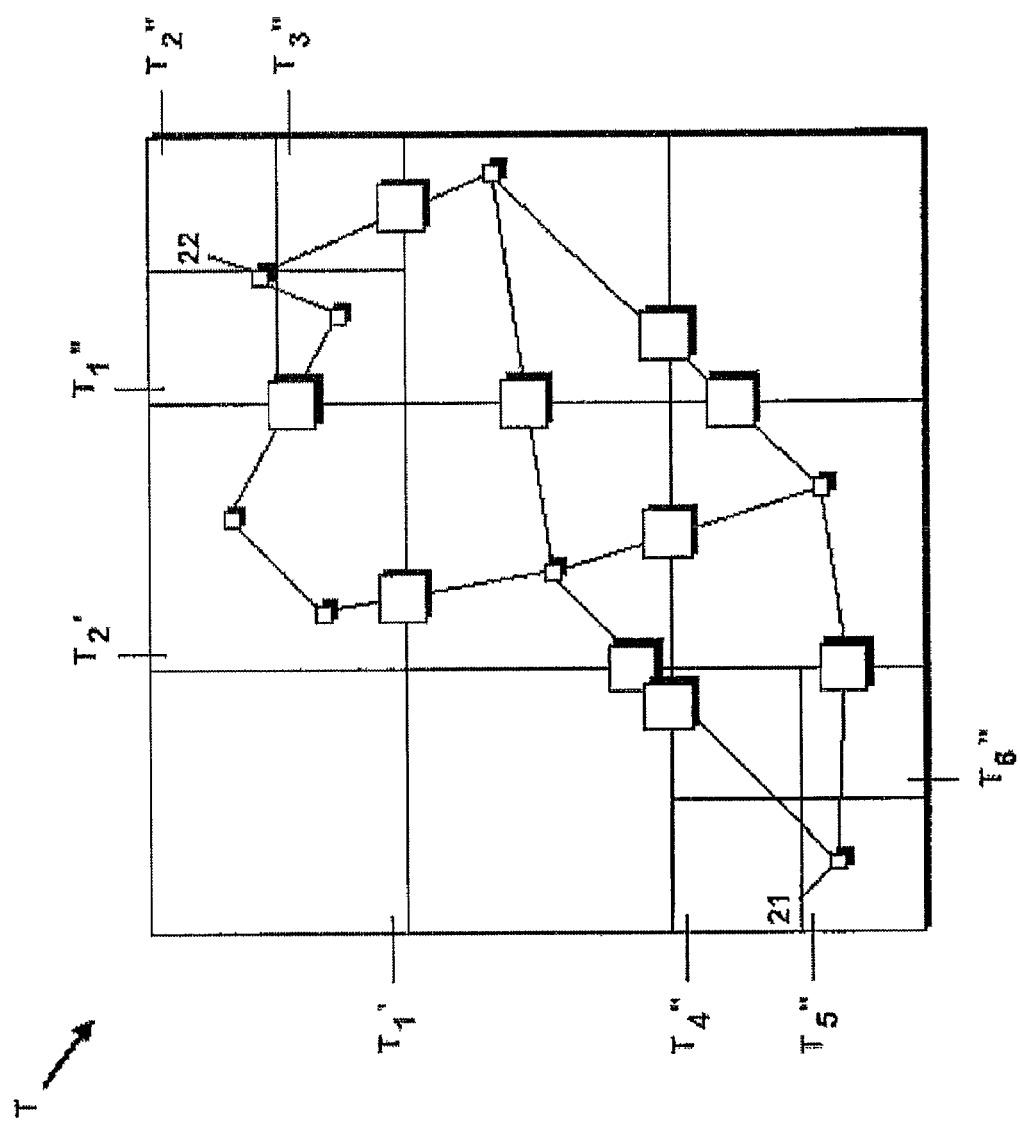
FIG. 15 illustrates still another example method using the road network of FIG. 3 and different filings.

After the starting point and the destination have been input, the tiling T shown schematically in FIG. 15 may be defined to include both tiles—of the tiling T' having a larger tile size and of the tiling T" having a smaller tile size. More particularly, smaller tiles $T_1"$-$T_6"$ are selected for a neighbourhood of the starting point and the destination, while larger tiles $T_1'$ and $T_2'$ may be selected for regions at a distance from both the starting point and the destination. The resistance value of each tile in this tiling having an inhomogeneous tile size is chosen to be the resistance value determined for the respective tile size and stored in the second storage unit 4. The various methods for determining a route from the starting point to the destination described above with reference to FIGS. 7-11 above may be readily applied to the inhomogeneous tiling shown in FIG. 15. It is noted that, while square tiles are shown in the drawings, any other suitable tile shape may be employed. Further, not all tiles need to have the same shape.

Figure 16:
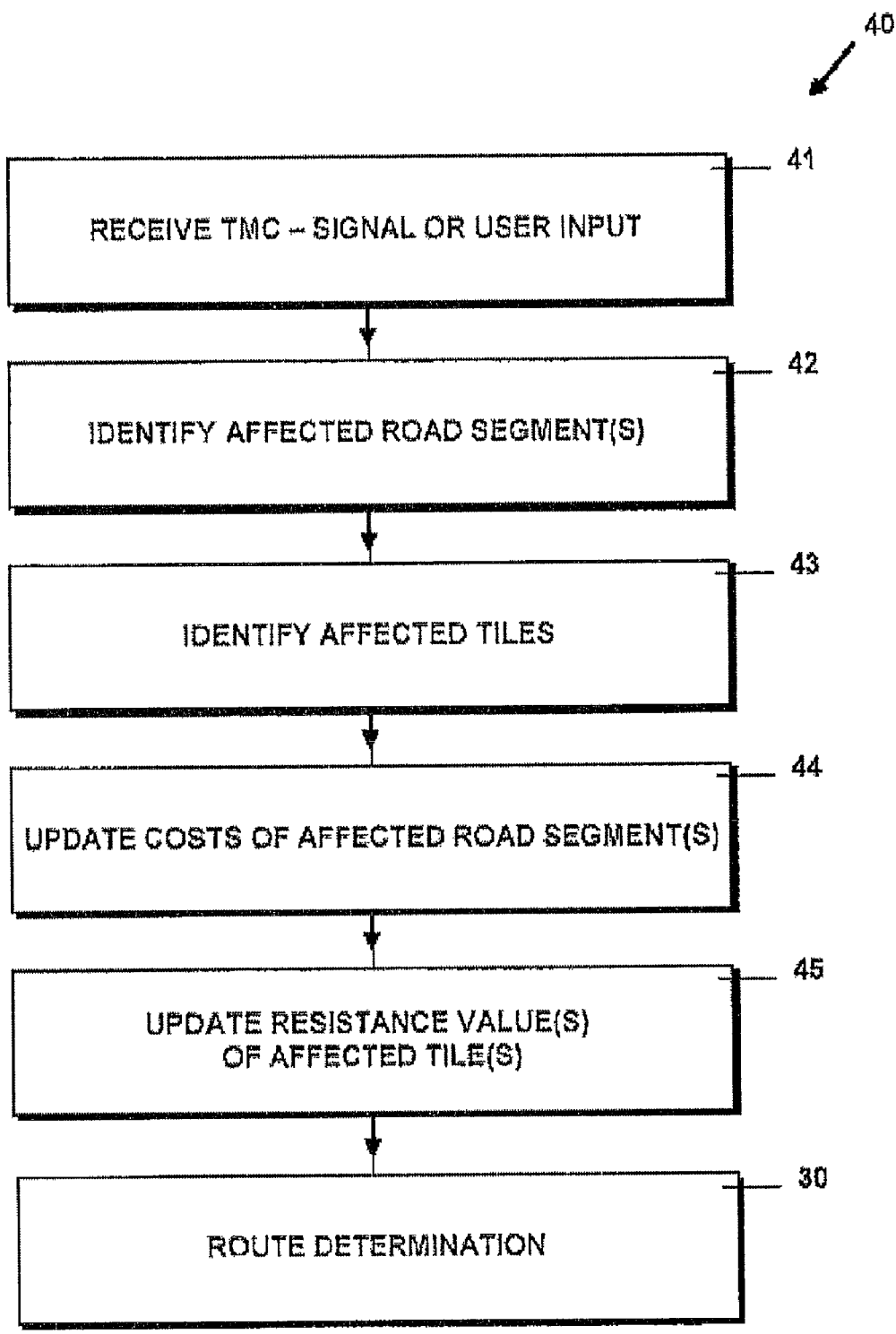
FIG. 16 is a flowchart illustrating operation of a method for dynamic route determination.

FIG. 16 is a flowchart illustrating operation of a method 40 for dynamic route determination. The method 40 shows dynamic route determination using the estimation function based on resistance values of tile when the method for determining a route is performed. At step 41, a traffic message channel ("TMC") signal or a user input may be received indicating that specific road segments are to be avoided; such as, for example, due to a traffic jam or due to user preferences. The road segments affected by the TMC signal or the user input are identified, as shown at step 42. At step 43, all tiles containing affected road segments are identified. At step 44, the costs associated with the affected road segments are updated according to the received TMC signal or user input. At step 45, the resistance value or the resistance values of the tiles containing affected road segments may be updated. Subsequently, the step of performing a route determination 30, as described above with reference to FIGS. 7-11, may be performed taking into account both the updated costs of affected road segments and the updated resistance values of affected tiles. In an example, the estimation function may be computed based on the updated resistance values.

The updating of resistance values of affected tiles, in step 45, may be carried out in a variety of different ways. For example, if the costs associated with a road segment located in an affected tile are increased, the resistance value of the affected tile may be multiplied by a given constant. The constant may be dependent on the received user input or TMC signal. Some user inputs or TMC signals may be used to indicate that all road segments contained in a given tile should be avoided. If, in such a case, the costs associated with these road segments are increased by a multiplicative factor, the resistance value of the tile containing these road segments will be multiplied by the same factor. In such a case, exact optimum routes may still be determined.

It is noted that resistance values of tiles may not be updated even if road segment costs are changed. Rather, the determined estimation function based on the original resistance values still underestimates costs to the destination. Therefore, step 45 may be omitted.

In another example, several resistance values may be provided for a single tile. The resistance values reflect the resistance values computed for, respectively, a given cost model without any specific user preferences or TMC signals, and for this given cost model when taking into consideration common TMC signals or user preferences. For example, for a tile which contains a road segment that is prone to traffic jams, two resistance values may be computed, one for the case that the road segment is not blocked, and one for the case that the road segment is blocked. Then, in accordance with the TMC signal received in step 41, either one of these resistance values may be selected in step 45.

In some examples, optimum routes may be determined for cost models formed of linear combinations of different cost models. For example, various weighted combinations of shortest-route and fastest-route cost models may be employed. If X and Y denote different cost models, and $\alpha \cdot X + \beta \cdot Y$ denotes the linear combination thereof, the resistance value of a tile for the combined cost model fulfils the following relation:

$$R(\alpha \cdot X + \beta \cdot Y) \geq \alpha \cdot R(X) + \beta \cdot R(Y), \qquad \text{(eq. 5)}$$

where R(X) and R(Y) denote the resistance values for the respective tile based on cost models X and Y, respectively. The linear combination of the resistance values of cost models may provide a lower bound on the resistance value of the linear combination of cost models. Since, for determining an estimation function, it is sufficient to provide a lower bound of costs, an estimation function for cost model $\alpha \cdot X + \beta \cdot Y$ may be obtained by approximating the resistance values of the combined cost model by the respective linear combination of the resistance values of the underlying, cost models X and Y. In an example implementation, for each tile of the tiling, a plurality of resistance values may be stored that corresponds to different basis cost models. If an optimum route search is performed for a cost model that corresponds to a linear combination of basis cost models, in the methods described above with reference to FIGS. 7-11, in a first step, the resistance value for a tile is determined as linear combination of basis cost models. In one embodiment, the basis cost models comprise shortest route and fastest route.

It will be appreciated that, due to the local nature of the resistance value, examples of methods and systems described here may be well suited for partial map updates. More specifically, if an existing road network is modified, or if the road network is supplemented by additional road segments on its exterior, for example, if new parts of a road network are digitized, only the resistance values of those tiles need to be updated in which the road network actually has been modified.

Figure 17:
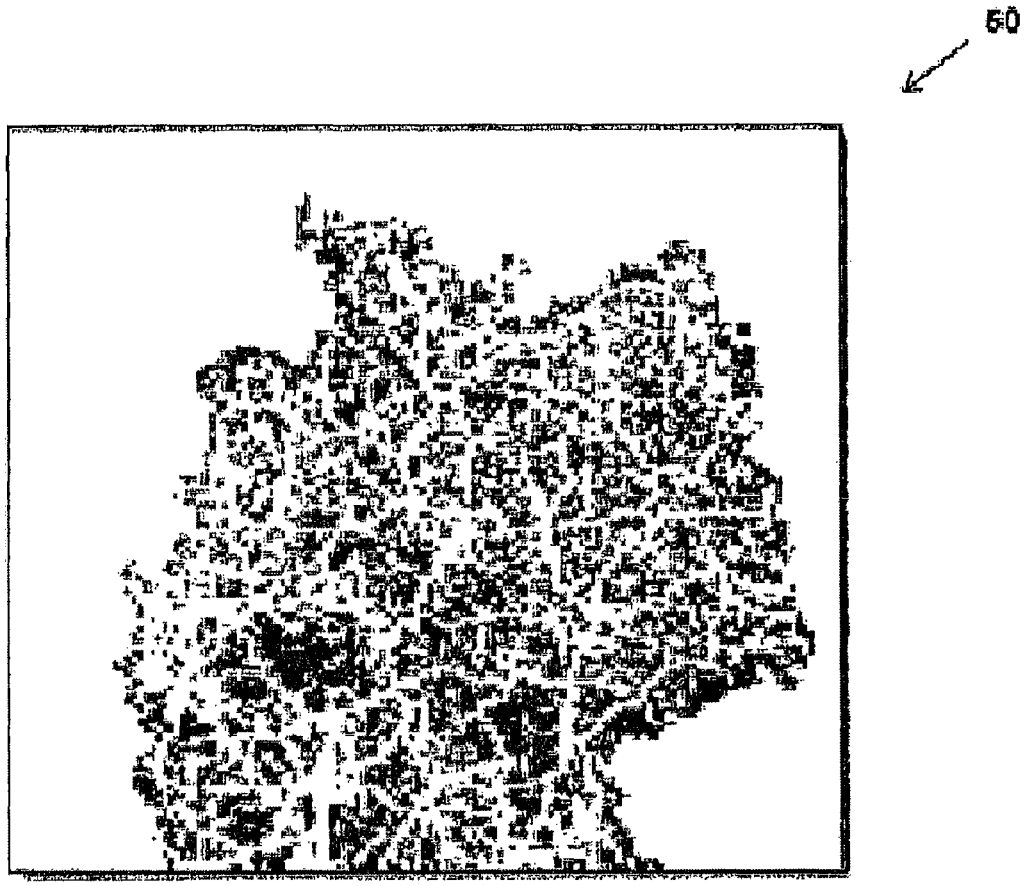
FIG. 17 depicts a portion of a map where tile resistance values are indicated in grayscales.

FIG. 17 depicts a portion of a map 50 where tile resistance values are indicated in grayscales. The map 50 shows a portion of northern and central Germany, in which higher resistance values are indicated with squares that are darker than those of lower resistance values. Tiles are chosen to be square in shape, having an edge length of eight kilometers. Resistance values are computed for a fastest-route cost model. As may be seen, the highways of the German road network in the map 50 in FIG. 17, which are expected to have lower resistance values, may be detected at regions formed by white squares at 52, which are indicative of tiles having lower resistance values.

Figure 18:
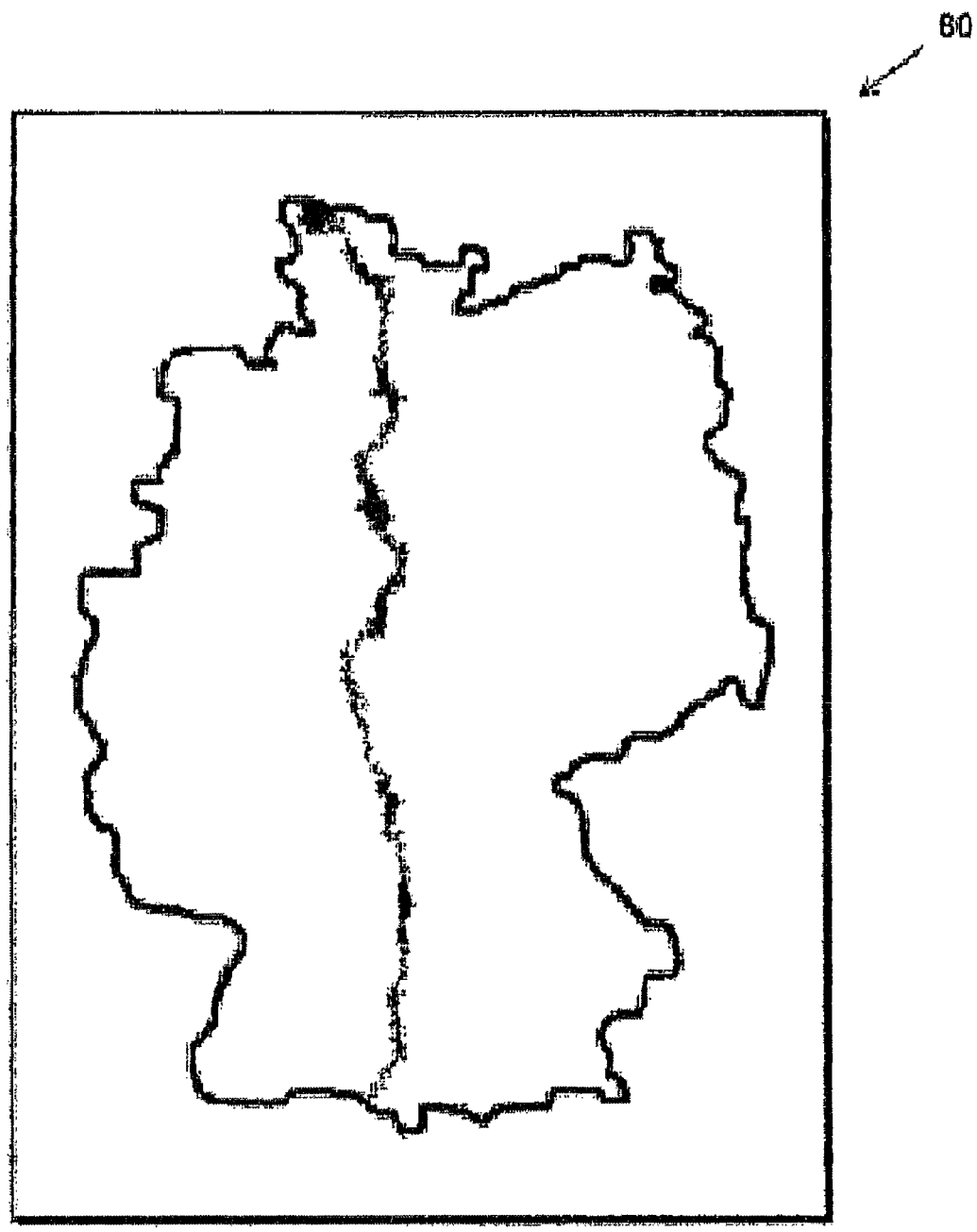
FIG. 18 depicts a region as a map searched using example methods for performing optimum route determination.
Figure 19:
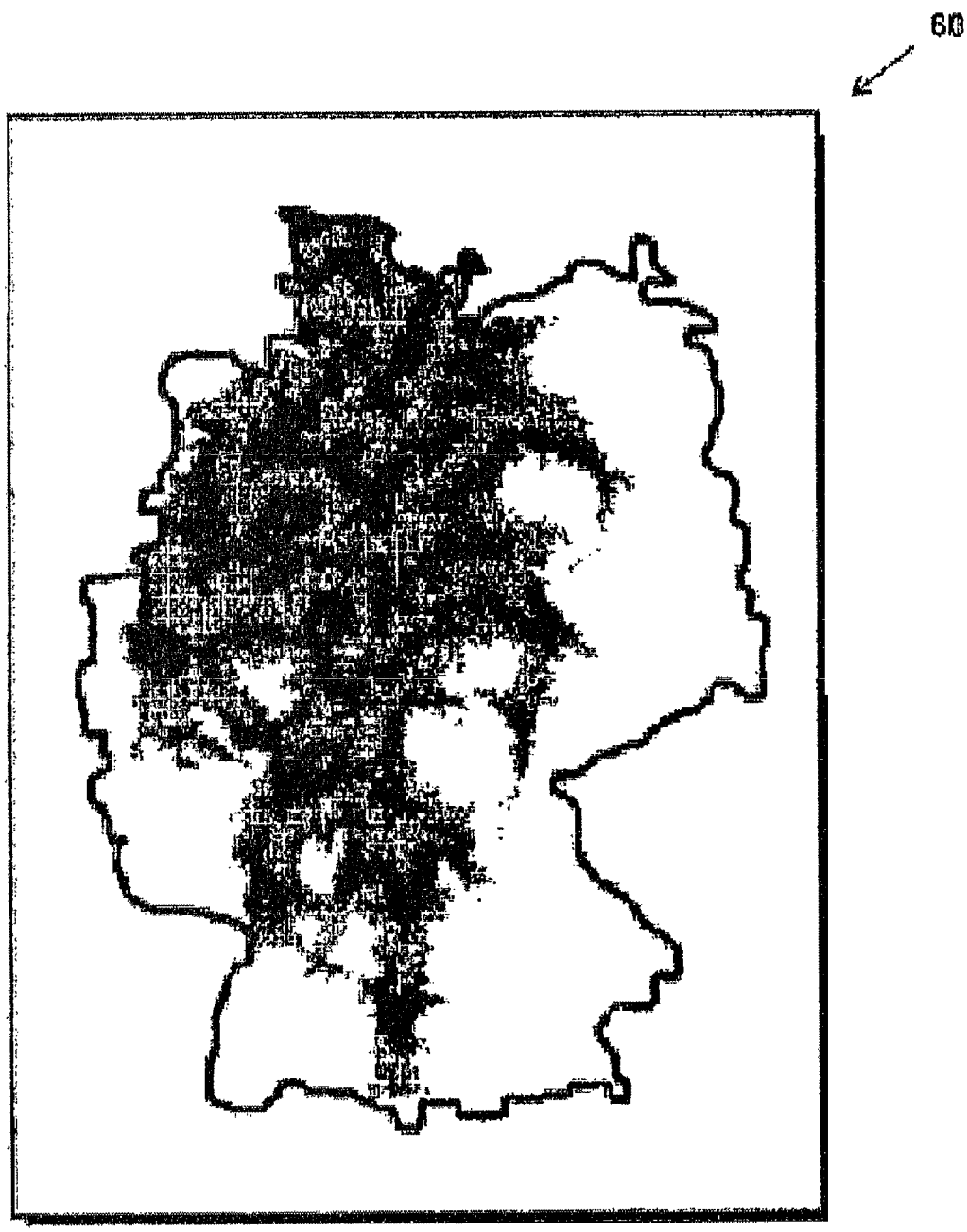
FIG. 19 depicts a region as a map searched using example methods for performing optimum route determination.

FIGS. 18 & 19 depict a region as a map searched using example methods for performing optimum route determination. FIG. 18 shows the searched region of FIG. 17 in an optimum route search starting from a starting point in northern Germany to a destination point in southern Germany as a greyscale representation where darker squares represent lower resistance values. FIG. 18 shows the searched region in the optimum route determination performed based on tile resistance values. FIG. 19 shows the searched region in an optimum route determination based on air-line distances. The optimum route is determined using an A*-algorithm. Tiles explored via edge relaxation are indicated in various greyscales, the different levels of darkness representing the accrued travel time from the starting point. As shown in FIGS. 18 and 19, the number of tiles that analyzed is much smaller in the method using tile resistance values (as shown in FIG. 18) than in the air-line distance method (as shown in FIG. 19). This results in shorter run times for the optimum route search.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for determining a route from a starting point to a destination on a road network of a navigation system employing an estimation function for a plurality of vertices of the road network, the estimation function providing a lower bound for costs associated with any route connecting a vertex of the road network and the destination, the method comprising:
    defining a tiling covering an area where at least a portion of the road network is contained;
    providing a resistance value of each tile of the tiling, and
    determining an estimation function value for a tile boundary vertex located on a tile boundary in dependence on the resistance values of tiles of the tiling, where the resistance value of a given tile represents costs associated with mutes connecting vertices of the road network located on a boundary of the given tile, so that a lower bound for costs associated with the routes connecting vertices located on the boundary of the given tile is derivable using the resistance value of the given tile.

2. The method of claim 1 where the resistance value of the given tile includes costs associated with routes connecting vertices located on the boundary of the given tile in relation to a geometrical property of the road network in the given tile.

3. The method of claim 1 where the resistance value of the given tile is a lower bound for the costs associated with an optimum route connecting a pair of vertices located on the boundary of the given tile relative to an air-line distance of the pair of vertices, the route traversing the given tile.

4. The method of claim 3 where the resistance value of the given tile is the minimum of the costs associated with an optimum route connecting any pair of vertices located on the boundary of the given tile divided by the air-line distance of the pair of vertices, such that the product of the resistance value of the given tile and an air-line distance of any pair of test vertices located on the boundary of the given tile is a lower bound of costs associated with an optimum route connecting the pair of test vertices within the given tile.

5. The method of claim 1 where the step of determining the estimation function value for the tile boundary vertex comprises:
    determining a destination tile containing the destination; and
    determining a first lower bound for costs associated with an optimum route connecting at least one destination tile boundary vertex located on a boundary of the destination tile and the tile boundary vertex.

6. The method of claim 5 comprising:
    determining the first lower bound in dependence on the resistance value of a tile or in dependence on the resistance values of a plurality of tiles of the tiling.

7. The method of claim 6 comprising:
    determining the first lower bound using Dijkstra's algorithm or an A*-algorithm for a sub-graph of the road network comprising vertices located on tile boundaries only.

8. The method of claim 7 comprising:
    determining costs associated with a sub-graph edge connecting first and second vertices located on a boundary of an arbitrary tile from a resistance value of the arbitrary tile and an air-line distance of the first and second vertices.

9. The method of claim 8 comprising:
    setting the costs associated with the sub-graph edge equal to the resistance value of the arbitrary tile multiplied by the air-line distance of the first and second vertices.

10. The method of claim 5 where the step of determining the estimation function value for the tile boundary vertex further comprises:
    determining a second lower bound for costs associated with an optimum route connecting the destination and the at least one destination tile boundary vertex; and
    adding the first lower bound and the second lower bound.

11. The method of claim 10 where the step of determining the estimation function value for the tile boundary vertex further comprises:
    determining a minimum of a sum of the first lower bound and the second lower bound over all destination tile boundary vertices.

12. The method of claim 1 further comprising the step of:
    determining an estimation function value for an interior vertex located inside of a tile from an estimation function value for a tile boundary vertex located on the boundary of the tile and a lower bound for costs associated with an optimum route connecting the interior vertex and the tile boundary vertex.

13. The method of claim 12 where the lower bound for costs associated with an optimum route connecting the interior vertex and the tile boundary vertex is determined from an air-line distance of the interior vertex and the tile boundary vertex.

14. The method of claim 12 where the lower bound for costs associated with an optimum route connecting the interior vertex and the tile boundary vertex is determined from a minimum air-line distance of the interior vertex from an edge of the tile on which the tile boundary vertex is located.

15. The method of claim 1 further comprising:
    detecting an increase in a cost factor of a road segment of the road network; and
    increasing a resistance value of a tile containing the road segment in accordance with the detected increase in cost factor.

16. The method of claim 15 where increasing the resistance value of the tile containing the road segment is multiplicative.

17. The method of claim 15 where the cost factor of the road segment is increased depending on a user input.

18. The method of claim 1 further comprising the step of automatically receiving a traffic message signal, where a cost factor of the road segment is increased depending on the received traffic message signal.

19. The method of claim 1 where a tile size of tiles of the tiling increases with increasing distance from the starting point and the destination.

20. The method of claim 19 where:
    a first resistance value is provided for each tile of a first regular tiling;

a second resistance value is provided for each tile of a second regular tiling; and the tiling covering the area comprises a first set of tiles of the first regular tiling and a second set of tiles of the second regular tiling, the resistance values of tiles of the tiling being equal to the corresponding first and second resistance values, respectively.

21. The method of claim 1 where, for each tile of the tiling, a first basis resistance value and a second basis resistance value are provided which, respectively, represent first and second basis cost models, where, for a cost model formed as a linear combination of the first ark second basis cost models, a lower bound on the resistance value is determined by lineal combination of the first and second basis resistance values.

22. The method of claim 1 where an optimum route from the starting point to the destination is determined employing an A*-algorithm which uses the estimation function determined in dependence on the resistance values of tiles of the tiling.

23. A method for determining a route to a destination on a graph employing as estimation function for a plurality of vertices of the graph, the estimation function providing a lower bound for costs associated with any route connecting a vertex of the graph and the destination, the method comprising:
defining a tiling covering an area where at least a portion of the graph is contained;
providing a resistance value for each tile of the tiling; and
determining an estimation function value for a tile boundary vertex located on tile boundary in accordance with the resistance values of tiles of the tiling, where the resistance value of a given tile represents costs associated with routes connecting vertices of the graph located on a boundary of the given tile, so that a lower bound for costs associated with, the routes connecting vertices located on the boundary of the given tile is derivable based on the resistance value of the given tile.

24. A method for pre-processing road network data comprising:
defining a tiling covering an area where at least a portion of the road network is contained; and
for a tile of the tiling:
determining vertices located on a boundary of the tile;
determining a lower bound for costs associated with an optimum route connecting any pair of the vertices located on the boundary of the tile divided by an air-line distance of the pair of vertices; and
outputting the determined lower bound.

25. The method of claim 24 where the lower bound is determined from a minimum of the costs associated with a route connecting an arbitrary pair of vertices located on the boundary of the tile divided by the air-line distance of the pair of vertices.

26. The method of claim 24 where the determined lower bound is discretized prior to outputting.

27. A system for determining a route from a starting point to a destination on a road network employing an estimation function for a plurality of vertices of the road network, the estimation function providing a lower bound for costs associated with routes connecting a vertex of the road network and the destination, the system comprising:
a first storage unit containing road network data;
a second storage unit containing tiling definition data defining a tiling and a resistance value for each tile; and
a processing unit determining an estimation function value for a tile boundary vertex located on a tile boundary in accordance with the resistance values of the tiles of the tiling, where the resistance value of a given tile, contained in the second storage unit, represents costs associated with routes connecting vertices of the road network located on a boundary of the given tile, so that a lower bound for costs associated with the routes connecting vertices located on the boundary of the given tile is derivable using the resistance value of the given tile.

28. The system of claim 27 where the resistance value of the given, tile, contained in the second storage unit, is a lower bound for costs associated with an optimum route connecting a pair of vertices located on the boundary of the given tile relative to an air-line distance of the pair of vertices, the route traversing the given tile.

29. The system of claim 27 where the resistance value of the given tile contained in the second storage unit is the minimum of the costs associated with an optimum route connecting any pair of vertices located on the boundary of the given tile divided by the air-line distance of the pair of vertices, such that the product of the resistance value of the given tile and an air-line distance of any pair of test vertices located on the boundary of the given tile is a lower bound of costs associated with an optimum route connecting the pair of vertices within the tile.

30. The system of claim 27 where the processing unit determines at least one destination tile boundary vertex located on a boundary of a destination tile containing the destination and computes a lower bound for costs associated with an optimum route connecting the tile boundary vertex and the at least one destination tile boundary vertex the lower bound being determined in accordance with the resistance values of the tiles of the tiling.

31. The system of claim 30 where the lower bound is computed employing Dijkstra's algorithm or an A*-algorithm with the destination tile boundary vertex as an origin.

32. The system of claim 27 where a memory unit storing coordinates of the tile boundary vertex and the estimation function value for the tile boundary vertex determined by the processing unit.

33. The system of claim 32 where the memory unit stores the coordinates of the tile boundary vertex in the form of a one-dimensional coordinate specifying a position of the tile boundary vertex along a line defined by the boundary of the tile.

34. The system of claim 27 where the processing unit receives a traffic message signal for a road segment of the road network and changes the resistance value of a tile containing the road segment in dependence on the received traffic message signal.

35. The system of claim 27 where the processing unit determines an optimum route from the starting point to the destination employing an A*-algorithm which uses estimation function values determined in dependence on the resistance values of tiles of the tiling and stored in the memory unit.

36. A navigation system, comprising:
an input function for inputting a destination;
an output function for outputting a determined route;
a system for determining a route from a starting point to a destination on a road network employing an estimation function for a plurality of vertices of the road network, the estimation function providing a lower bound for costs associated with routes connecting a vertex of the road network and the destination, the system comprising:

a first storage unit containing road network data;

a second storage unit containing tiling definition data defining a tiling and a resistance value for each tile; and a processing unit determining an estimation function value for a tile boundary vertex located on a tile boundary in accordance with the resistance values of the tiles of the tiling, where the resistance value of a given tile, contained in the second storage unit, represents costs associated with routes connecting vertices of the road network located on a boundary of the given tile, so that a lower bound for costs associated with the routes connecting vertices located on the boundary of the given tile is derivable using the resistance value of the given tile; and the system coupled to the input function for receiving the destination and to the output function for outputting a determined route.

37. The navigation system of claim 36 comprising:

means for determining a current vehicle position coupled to the system for determining a route, for providing the current vehicle position as the starting point.

38. The navigation system of claim 37 where the means for determining a current vehicle position includes a GPS-receiver.

39. The navigation system of claim 37 where a traffic message channel receiver is coupled to the processing unit for providing a traffic message signal.

* * * * *